Jan. 13, 1953 W. G. LUNDQUIST 2,625,006
COMPOUND ENGINE

Filed Nov. 25, 1947 2 SHEETS—SHEET 1

INVENTOR
WILTON G. LUNDQUIST.
BY *Victor D. Behr*
ATTORNEY

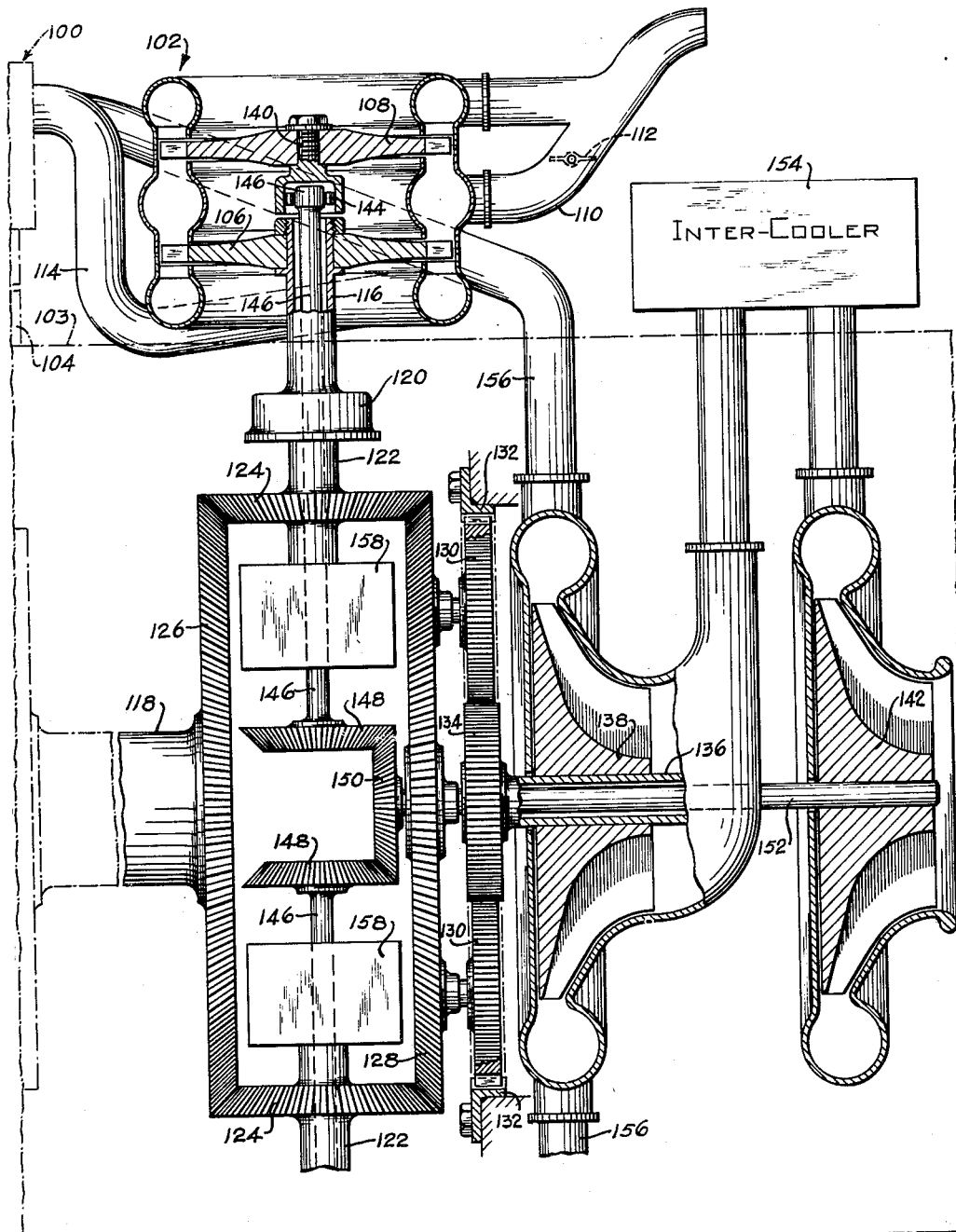

Patented Jan. 13, 1953

2,625,006

UNITED STATES PATENT OFFICE 2,625,006

COMPOUND ENGINE

Wilton G. Lundquist, Hohokus, N. J., assignor to Curtiss-Wright Corporation, a corporation of Delaware Application November 25, 1947, Serial No. 787,946

6 Claims. (Cl. 60—13)

This invention relates to internal combustion engines and is an improvement of the invention disclosed in copending application Serial Number 760,385, filed July 11, 1947, in the name of A. Chilton.

The invention is particularly directed to the recovery of power from the exhaust gases of a reciprocating type internal combustion engine and an object of this invention comprises the provision of a novel and efficient arrangement for this purpose.

By a "blow-down" turbine is meant a turbine in which each turbine nozzle box section receives exhaust gases from only one engine cylinder or from a plurality of engine cylinders whose exhaust strokes do not overlap or overlap only slightly. In addition, for a blow-down turbine the arrangement is such that the kinetic energy imparted to the exhaust gases, during their escape through an exhaust port of an engine cylinder, is largely retained as kinetic energy in its passage to the turbine wheel so that this energy can be transmitted to the turbine wheel with a minimum of loss. By a "pressure" turbine is meant a turbine in which the exhaust from a plurality of engine cylinders having overlapping exhaust strokes is transmitted to a common chamber before said gases are directed against the rotor blades of the pressure turbine. In the case of a pressure turbine, the kinetic energy imparted to the exhaust gases, during their escape through an exhaust port of an engine, is largely dissipated in turbulence in said common chamber.

In accordance with the present invention each pair of blow-down and pressure turbines is supported on the engine crankcase rearwardly of the engine cylinders so as not to add materially to the overall diameter of the engine. In addition the shafts of each such pair of turbines are co-axial and extend substantially radially into the engine crankcase, the blow-down turbine shaft being drivably connected to the engine crankshaft while the pressure turbine is drivably connected to a supercharger for the engine.

Other objects of the invention will become apparent upon reading the annexed detailed description in connection with the drawing, in which:

Figure 3 is a view similarly to Figure 1 but of a modified form of the invention.

Figure 1:
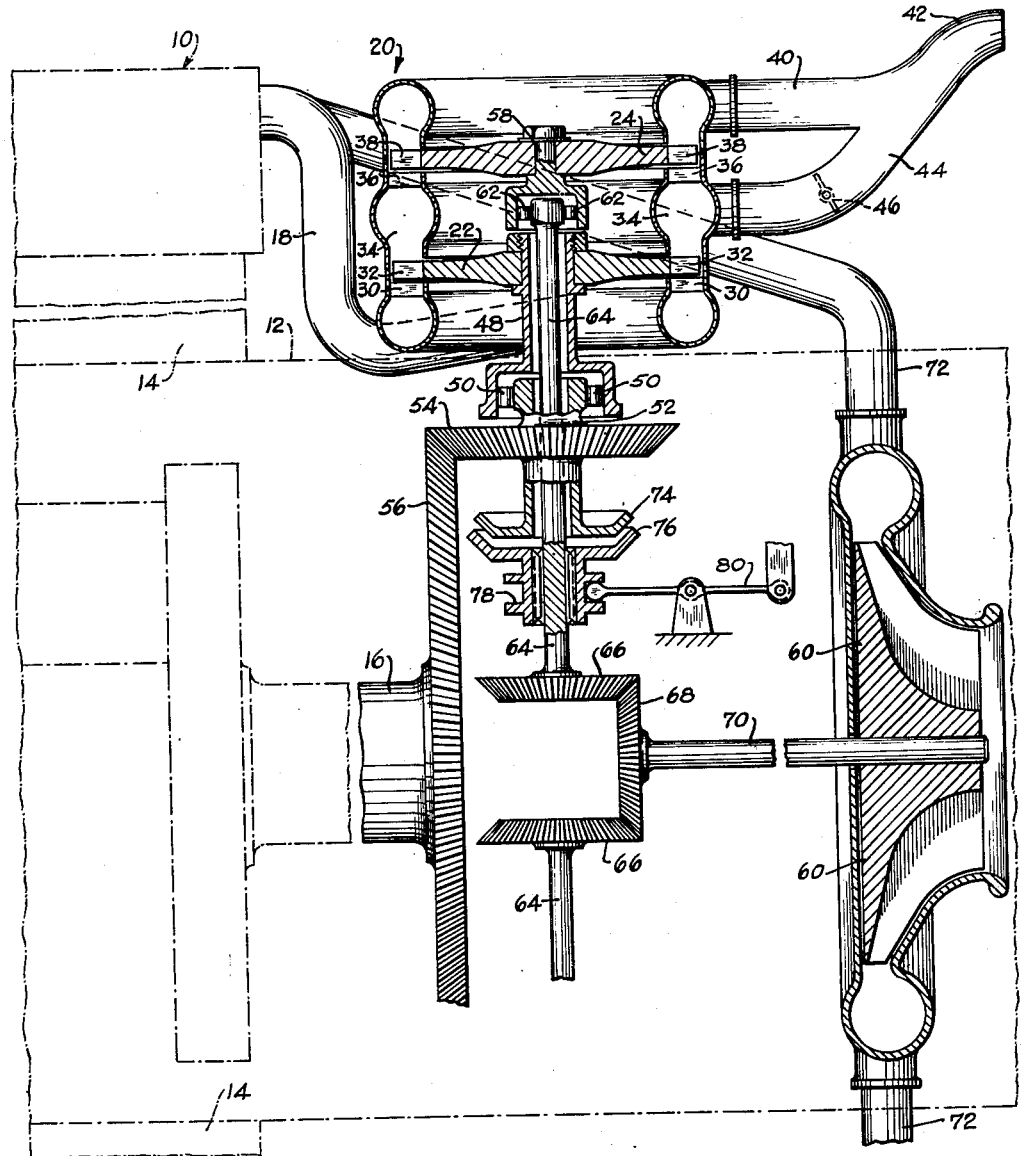
Figure 1 is a schematic view partly in section of an internal combustion engine embodying the invention.

Referring to Figure 1 of the drawing, a conventional radial-cylinder reciprocating-type internal combustion engine is schematically indicated at 10. The engine 10 comprises a crankcase 12 having a plurality of cylinders 14 extending radially therefrom. Each cylinder 14 has a piston mounted for reciprocation therein, said pistons being operatively connected to the engine crankshaft 16. The exhaust gases of each cylinder 14 discharge into an exhaust pipe 18 from which said exhaust gases are supplied to one of a plurality of gas turbine units 20.

Figure 2:
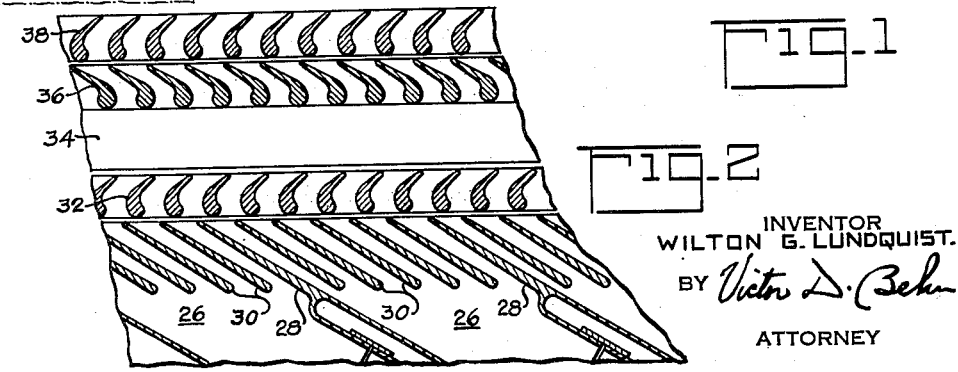
Figure 2 is a schematic developed view of the rotor blades and nozzle box construction of a pair of blow-down and pressure turbines.

Each gas turbine unit 20 comprises a first stage turbine 22 and a second stage turbine 24 co-axial with its associated first stage turbine. The first stage turbine 22 comprises a blow-down turbine and the second stage turbine 24 comprises a pressure turbine. Each cylinder exhaust pipe 18 terminates in a nozzle 26 (Figure 2) of a blow-down turbine 22, and each blow-down turbine 22 may be provided with a plurality of such nozzles 26 to provide an annular nozzle construction. For example, where each blow-down turbine 22 is supplied with exhaust gases from $n$ engine cylinders, said turbine preferably has $n$ individual nozzles 26, each subtending approximately $$\frac{360°}{n}$$

about the axis of its turbine. As illustrated in Figure 2, the blow-down turbine nozzles 26 are separated by partitions 28 and each nozzle 26 is provided with guide vanes 30 for directing the exhaust gases against the blades 32 of the blow-down turbine. Instead of providing each blow-down turbine with an individual nozzle 26 for each engine cylinder, each nozzle 26 may be supplied with exhaust gases from more than one engine cylinder if their exhaust strokes do not overlap or only overlap slightly.

The entire exhaust of each blow-down turbine 22 is discharged into an annular chamber 34, disposed between each pair of blow-down and pressure turbines, from which it is directed by an annular nozzle or guide vanes 36 against the blades 38 of its associated pressure turbine 24. Each pressure turbine 24 discharges into an exhaust duct 40 communicating with a nozzle 42 through which the exhaust gases discharge into the surrounding atmosphere. Each turbine unit 20 is also provided with a by-pass passage 44 between its chamber 34 and exhaust duct 40. In addition a controllable valve 46 is disposed in each said by-pass passage 44.

The rotor of each blow-down turbine 22 is rigid with a hollow shaft 48 which is drivably connected to the engine crankshaft 16 through one-way clutch rollers 50, a hollow shaft 52, and bevel gears 54 and 56. Each such one-way clutch is arranged so that its associated blow-down turbine 22 can drive the engine crankshaft 16 but the crankshaft cannot drive said turbines. The rotor of each pressure turbine 24 is rigid with a shaft 58 which is drivably connected to the impeller 60 of an engine supercharger through one-way clutch rollers 62, a shaft 64 coaxially disposed within the hollow shaft 52 of its associated blow-down turbine, bevel gears 66 and 68 and a shaft 70. The latter one-way clutches with their rollers 62 are arranged so that the pressure turbines 24 can drive the supercharger impeller 60 but said clutches overrun to prevent any drive of the pressure turbines 24 from their shafts 64. The air compressed by the supercharger 60 is delivered to the engine cylinders through intake passages or pipes 72 extending between said turbine units. In addition the shafts 52 and 64 of each turbine unit 20 are coaxial and extend radially into the engine crankcase. With this arrangement, the turbine units 20 can be disposed immediately to the rear of the engine cylinders so as not to add materially to the overall diameter on the engine.

With the aforedescribed construction, each blow-down turbine 22 extracts kinetic energy from the exhaust gases and converts said energy into mechanical power to help drive the engine crankshaft. In addition each pressure turbine 24 extracts at least a portion of the remaining available energy in the exhaust gases delivered thereto for driving the supercharger impeller 60.

The amount of energy extracted by the blow-down and pressure turbines, respectively, from the exhaust gases can be controlled by the valves 46. For example, at a particular atmospheric pressure, closure of a valve 46 raises the pressure in its associated turbine chamber 34, thereby raising the pressure to which its blow-down turbine exhausts. This increase in the pressure in a chamber 34 results in a decrease in the energy extracted from the exhaust gases by said blow-down turbine. At the same time, this increase in pressure in a turbine chamber 34 increases the pressure difference across its pressure turbine 24 thereby increasing the energy said pressure turbine extracts from the exhaust gases. Accordingly closure of a valve 46 decreases the energy delivered directly to the engine crankshaft by the associated blow-down turbine and increases the energy delivered to the engine supercharger 60 by the associated pressure turbine.

In the case of an aircraft engine, the valves 46 may be controlled to maintain substantially sea level atmospheric pressure in their turbine chamber 34. With the valve 46 so controlled, the energy delivered to the engine crankshaft by the blow-down turbines is substantially independent of altitude and, because of the resulting increase in the pressure difference across the pressure turbines with increase in altitude, the speed of the pressure turbines increases with increase in altitude whereby more energy is delivered to the engine driven supercharger 60 with increase in altitude. This increase in speed of the engine driven supercharger with increase in altitude at least partially compensates for the decrease in density of the air taken in by said supercharger with increase in altitude.

In conventional reciprocating type engines for aircraft, the engine starter is generally arranged to transmit engine starting torque to the engine crankshaft through the supercharger impeller shaft. In order to utilize this usual starting arrangement, a suitable clutch is provided so that the impeller shaft 70 can be connected to the engine crankshaft. For example, as illustrated, at least one of the hollow shafts 52 is provided with a cone clutch member 74 having a complementary cone clutch member 76 slidably splined to the adjacent shaft 64. The slidable cone clutch member 76 is provided with an annular groove 78 and one end of a lever 80 is received within said groove. With this arrangement, engagement and disengagement of the cone clutch members 74 and 76 is controlled by the lever 80. Accordingly when the engine is to be started the impeller shaft 70 is first connected to the engine crankshaft 16 by operating the lever 80 to engage the cone clutch members 74 and 76 thereby providing a driving connection for the engine starter to the engine crankshaft 16. Once the engine has been started, said cone clutch members 74 and 76 are disengaged.

The arrangement of Figures 1 and 2 may be modified to include a supercharger geared to the engine crankshaft, such a two stage supercharger arrangement being illustrated in Figure 3. In Figure 3, an engine 100 is provided with a plurality of circumferentially spaced turbine units 102 mounted on the engine crankcase 103 rearwardly of the engine cylinders 104. The turbine units 102 of Figure 3 are similar to the turbine units 20 of Figures 1 and 2. Thus each turbine unit 102 comprises a blow-down turbine 106, a pressure turbine 108 and a by-pass passage 110 connected around the pressure turbine 108 with a control valve 112 in said passage. Exhaust gases are delivered to each blow-down turbine from the engine cylinders through exhaust pipes 114.

Each blow-down turbine 106 of a turbine unit 102 is rigid with a hollow shaft 116 and is drivably connected to the engine crankshaft 118 through a one-way clutch 120, a hollow shaft 122 and bevel gears 124 and 126. In addition, each bevel gear 124 is in mesh with a common bevel gear 128, said latter gear comprising a carrier for a plurality of planet pinions 130. The planet pinions 130 are disposed between a fixed annular gear 132 and a sun gear 134. The sun gear 134 is drivably connected to a hollow shaft 136 of a supercharger impeller 138. In this way the blow-down turbines 106, the engine crankshaft 118 and the supercharger impeller 138 are all drivably connected together. The one-way clutches 120 prevent any drive to the blow-down turbines 106 from their shafts 122, but said clutches provide a driving connection in the reverse direction from the blow-down turbines to the engine crankshaft.

Also in Figure 3, each pressure turbine 108, of a turbine unit 102, is rigid with a shaft 140 which is drivably connected to a supercharger 142 through a one-way clutch 144, a shaft 146, bevel gears 148 and 150 and a shaft 152. The bevel gear 128 is journaled on the shaft 152 for rotation relative thereto. In addition the supercharger impeller shaft 152 extends co-axially through the hollow impeller shaft 136, both said impeller shafts being co-axial with the engine crankshaft 118.

The supercharger 142 delivers its compressed air to the supercharger 138 through an intercooler 154 and from the supercharger 138 the further compressed air is delivered to the various engine cylinders through intake pipes 156. In addition, in Figure 3, an engageable clutch 158, which may be similar to the cone clutch 74, 76 of Figure 1, is provided between at least one pair of shafts 122 and 146 in order to permit the engine to be started by the application of torque to the supercharger impeller shaft 152. Also, as in Figure 1, the turbine shafts 122 and 146 all extend radially from the engine crankcase.

From the above description it should be apparent that the operation of Figure 3 is similar to that of Figure 1 except that the engine intake air is further compressed by a supercharger 138 drivably connected to the engine crankshaft.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. In combination: a multi-cylinder internal combustion engine having a crankcase with a crankshaft therein; a plurality of circumferentially spaced engine cylinders mounted on and about said crankcase; a supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine and a second stage pressure turbine disposed adjacent to and co-axial with its first stage turbine with the axis of each such unit being disposed substantially radially relative to said crankshaft, each first stage turbine including a plurality of individual inlet nozzles receiving exhaust gases from different engine cylinders for driving said first stage turbine and each second stage turbine being arranged to be driven by the exhaust gases discharging from its associated first stage turbine; means drivably connecting each first stage turbine to said crankshaft; and means drivably connecting each second stage turbine to said supercharger.

2. In combination: a multi-cylinder internal combustion engine having a crankcase with a crankshaft therein; a plurality of circumferentially spaced engine cylinders mounted on and about said crankcase; a supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine, and a second stage pressure turbine disposed adjacent to and co-axial with its first stage turbine with the axis of each such unit being disposed substantially radially relative to said crankshaft, each first stage turbine including a plurality of individual inlet nozzles receiving exhaust gases from different engine cylinders for driving said first stage turbine and each second stage turbine being arranged to be driven by the exhaust gases discharging from its associated first stage turbine; means drivably connecting each first stage turbine to said crankshaft; means drivably connecting each second stage turbine to said supercharger; and a clutch operable to drivably connect said supercharger to said crankshaft.

3. In combination: a multi-cylinder internal combustion engine having a crankcase with a crankshaft therein; a plurality of circumferentially spaced engine cylinders mounted on and about said crankcase; a supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine and a second stage pressure turbine disposed adjacent to and co-axial with its first stage turbine with the axis of each such unit being disposed substantially radially relative to said crankshaft, each first stage turbine including a plurality of individual inlet nozzles receiving exhaust gases from different engine cylinders for driving said first stage turbine and each second stage turbine being arranged to be driven by the exhaust gases discharging from its associated first stage turbine; means drivably connecting each first stage turbine to said crankshaft such that torque can be transmitted from each first stage turbine to said crankshaft but not in the reverse direction; means drivably connecting each second stage turbine to said supercharger; a clutch engageable to drivably connect said supercharger to said crankshaft; and means to prevent each second stage turbine from being driven through said clutch upon engagement of said clutch.

4. In combination: a multi-cylinder internal combustion engine having a crankcase with a crankshaft therein; a plurality of circumferentially spaced engine cylinders mounted on and about said crankcase; a two stage supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine and a second stage pressure turbine disposed adjacent to and co-axial with its first stage turbine with the axis of each such unit being disposed substantially radially relative to said crankshaft, each first stage turbine including a plurality of individual inlet nozzles receiving exhaust gases from different engine cylinders for driving said first stage turbine and each second stage turbine being arranged to be driven by the exhaust gases discharging from its associated first stage turbine; means drivably connecting each first stage turbine to said crankshaft and to the second stage of said supercharger; and means drivably connecting each second stage turbine to the first stage of said supercharger.

5. In combination: a multi-cylinder internal combustion engine having a crankcase with a crankshaft therein; a plurality of circumferentially spaced engine cylinders mounted on and about said crankcase; a supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine and a second stage pressure turbine disposed adjacent to and co-axial with its first stage turbine, each first stage turbine including a plurality of individual inlet nozzles receiving exhaust gases from different engine cylinders for driving said first stage turbine and each second stage turbine being arranged to be driven by the exhaust gases discharging from its associated first stage turbine; a shaft for each said turbine with the two shafts of each pair of first and second stage turbines being co-axially disposed, one within the other, and extending into said crankcase; gearing drivably connecting the shaft of each second stage turbine to said supercharger; and gearing drivably connecting the shaft of each first stage turbine to said crankshaft, said latter gearing being disposed within said crankcase forwardly of said supercharger.

6. In combination: a multi-cylinder internal combustion engine having a crankcase with a crankshaft therein; a plurality of circumferentially spaced engine cylinders mounted on and about said crankcase; a supercharger for the engine intake air co-axially disposed adjacent to the rear end of said crankshaft; a plurality of circumferentially spaced turbine units mounted on said crankcase rearwardly of said cylinders; each of said turbine units comprising a first stage blow-down turbine and a second stage pressure turbine disposed adjacent to and co-axial with its first stage turbine, each first stage turbine including a plurality of individual inlet nozzles receiving exhaust gases from different engine cylinders for driving said first stage turbine and each second stage turbine being arranged to be driven by the exhaust gases discharging from its associated first stage turbine; a shaft for each said turbine extending substantially radially into said crankcase with the shaft of each second stage turbine being co-axial with and extending through the shaft of its associated first stage turbine; gearing drivably connecting the shaft of each second stage turbine to said supercharger; and gearing drivably connecting the shaft of each first stage turbine to said crankshaft, said latter gearing being disposed within said crankcase forwardly of said supercharger.

WILTON G. LUNDQUIST.

REFERENCES CITED

The following references are of record in the file of this patent:

UNITED STATES PATENTS

| Number | Name | Date |
|---|---|---|
| 836,945 | Poole | Nov. 27, 1906 |
| 1,732,578 | Garuffa | Oct. 22, 1929 |
| 2,127,460 | Chilton | Aug. 16, 1938 |
| 2,128,789 | Anxionnaz | Aug. 30, 1938 |
| 2,173,595 | Schütte | Sept. 19, 1939 |
| 2,197,179 | Hersey | Apr. 16, 1940 |
| 2,305,295 | Lang et al. | Dec. 15, 1942 |
| 2,375,006 | Larrecq | May 1, 1945 |
| 2,387,560 | Boulet | Oct. 23, 1945 |
| 2,397,941 | Birkigt | Apr. 9, 1946 |
| 2,402,725 | Birkigt | June 25, 1946 |

FOREIGN PATENTS

| Number | Country | Date |
|---|---|---|
| 813,297 | France | Feb. 23, 1937 |
| 398,902 | Germany | July 16, 1924 |